United States Patent Office 3,505,235
Patented Apr. 7, 1970

3,505,235
CORROSION INHIBITORS BASED ON VINYLPYRIDINE POLYMERS
Thaddeus M. Muzyczko, Melrose Park, Samuel Shore, Roselle, and Jerome A. Martin, Chicago, Ill., assignors to The Richardson Company, Melrose Park, Ill., a corporation of Ohio
No Drawing. Filed June 13, 1967, Ser. No. 645,589
Int. Cl. C02b 5/06; C08f 33/00
U.S. Cl. 252—82     12 Claims

ABSTRACT OF THE DISCLOSURE

This invention is directed to corrosion inhibitors of vinylpyridine polymers including their salts and combinations with acetylenic alcohols. Illustrative of the corrosion inhibitors are the polyvinylpyridine, its methyl iodide quaternary salt and the mixtures of polyvinylpyridine and propargyl alcohol.

BACKGROUND

This invention relates to useful corrosion inhibitor products based on vinylpyridine polymers. These corrosion inhibitors are film forming and thereby provide extremely useful protection to metal substrates being cleaned with acid systems.

Various metal cleaning systems are known in the art. They generally involve the use of dilute, non-oxidizing acid solutions employing such acids as hydrochloric, acetic, sulfuric, phosphoric, formic, oxalic, citric, as well as their salts. These acid solutions usually contain small amounts of corrosion inhibitors (.05%–5.0% by weight). The amount of inhibitor used depends on the type of acid, the acid concentration, temperature and various other factors in the acid cleaning solution. The main function of the cleaning acid is to remove scale and other encrustations from the metal. Accordingly, the purpose of the inhibitor is to minimize the acid attack on the metal itself. To illustrate the general art of corrosion inhibitors, reference may be made to U.S. 3,049,496.

Although numerous corrosion inhibitors are known, they have not been entirely satisfactory for such reasons as inadequate metal protection, high toxicity, cost, difficulties in manufacture and the like. In addition, increased and longer lasting protection of the metal surfaces is needed.

Accordingly, one object of this invention is the production of a corrosion inhibitor possessing improved inhibitive properties. Another object of this invention is a polymeric film forming corrosion inhibitor. Other objects will become apparent in the detail description below.

SUMMARY

Briefly, this invention relates to useful corrosion inhibitor products based on vinylpyridine polymers. These products are film forming and provide very useful protection for metals being cleaned with non-oxidizing acid solutions. The corrosion inhibitors include soluble salts of the vinylpyridine polymers as well as mixtures with acetylenic alcohols and low or non-foaming surfactants.

DETAILED DESCRIPTION

The vinylpyridine polymers are further characterized as polymeric compounds soluble in aqueous systems containing acids and having at least major amounts of groups derived from vinylpyridine. Othere groups derived from polymerizable vinyl monomers such as styrene, acrylates, ethylene, propylene, vinyl chloride and the like may also be present in the polymer. Advantageously the polymer is essentially based on the vinylpyridine group and preferably is polyvinylpyridine. The resultant polymer is soluble in aqueous systems containing acids and is film forming. The property of film forming enables the material to effectively bond to the metal surface and provide an effective measure of protection in addition to having a high degree of permanence compared to monomeric corrosion inhibitors.

Usually, only a small amount of the inhibitor is needed in the aqueous solution. Generally amounts in the order of 0.01–1 volume percent are utilized and more commonly in the order of 0.01–0.5 volume percent. An advantageous range is in the order of 0.05–0.2 volume percent.

The inhibitors are effective not only at the ordinary temperatures but also at elevated temperatures at which their polymeric and film forming characteristics provide greater permanence on the metal. In general their effectiveness is useful at temperatures in the order of 150° F. In addition they are usually effective in various concentrations of acids, even including hydrochloric acid up to approximately 37%.

The inhibitors of the invention are prepared from vinylpyridine in a polymerization process which can include other vinyl monomers as described above. One advantageous method is by a free radical bulk polymerization of the vinyl monomer, although, suspension, solution, or emulsion polymerization may be used.

Applications in which the inhibitors are particularly useful include chemical cleaning systems, metal pickling, oil well-acidizing solutions, and the like.

The salts are prepared from the vinylpyridine polymer by the use of the appropriate organic compositions. These salts include amine acid salts such as the pyridine hydrochloride and quaternary salts such as the alkyl halide of the vinylpyridine polymer and betaines. Suitable alkyl halides include the chlorides and iodides, wherein the alkyl is advantageously a lower alkyl and preferably methyl and ethyl as for example in tetrachloroethane. In addition, betaines prepared from such materials as sodium chloroacetate provide very useful compositions.

The vinylpyridine polymer, its salts, or mixtures thereof are also advantageously used in mixture with acetylenic alcohols such as propargyl alcohol to provide increased effectiveness. The alcohol is present in a minor but effective amount, usually being in the order of 15–50% by weight of the mixture with the remaining major amount being the polymeric material.

The following examples illustrate some of the embodiments of this invention. It is to be understood that these are for illustrative purposes only and do not purport to be wholly definitive to conditions or scope.

Example I

Approximately 50 gm. of para-vinylpyridine was mixed with about 0.2 gm. of benzoyl peroxide in a covered tin cannister. The cannister was immersed in a constant temperature bath (approximately 50° C.) for about 48 hours. The resultant polymer was a hard brittle transparent amber material. Approximately 27 gm. of the polymer was dissolved in 500 ml. of acetone for use as a corrosion inhibitor. This solution is identified below as Product A.

Example II

Approximately 50 ml. of Product A was placed in a 200 ml. reaction flask. Methyl iodide (approximately 3.69 gm.) was slowly added with mixing at about 25° C. The resultant solution of the quaternary salt was a clear amber, low viscosity, liquid. This product is identified below as Product B.

Example III

Approximately 50 ml. of Product A was placed in a 200 ml. reaction flask. Tetrachloroethane (approximately 4.31 gm.) was slowly added with mixing at about 26° C. The resultant solution of the quaternary salt was a clear amber, low viscosity, liquid. This product is identified below as Product C.

Example IV 50 ml. of Product A was placed in a 100 ml. beaker. Propargyl alcohol (approximately 1.46 gm.) was added and the solution was agitated for one hour at approximately 30° C. This product (mixture of polymer and alcohol) is identified below as Product D.

Example V

The products identified above were used to determine corrosion rates on coupons of 316 stainless steel, 1010 steel, and 1020 sheet steel stock. The coupons were approximately 1" x 2¾" and approximately ⅛" or 3⁄16" in thickness.

Each coupon was carefully pickled in well inhibited 5% (weight) HCl at approximately 180° F. until the mill scale and other surface irregularities were removed. The coupons were then washed in a detergent, rinsed with water, followed by acetone, and dried and stored in a desiccator. Each coupon was weighed to the nearest 0.1 milligram, immersed in 150 ml. of the acid solution and placed in a regulated oven at approximately 80° F. for the corrosion test. After a 24 hour period, the coupons were removed from the acid solution, rinsed in a detergent solution, followed by water and by acetone rinsing, and then dried and stored in a desiccator. The coupons were then re-weighed to the nearest 0.1 mg. and inspected for surface irregularities.

The results of the test are listed below. For comparison purposes, a control is listed and represents the uninhibited acid solution in Table I.

TABLE I

| Test solution inhibitor | Coupon | HCl wt. percent | Corrosion rates, IPY | Percent inhibition |
|---|---|---|---|---|
| A (0.1 vol. percent) | (1) | 10 | 0.12 | 89.1 |
| Control | (1) | 10 | 1.10 | 0 |
| A (0.1 vol. percent) | (2) | 15 | 1.57 | 73.7 |
| Control | (2) | 15 | 5.98 | 0 |
| B (0.1 vol. percent) | (3) | 15 | 0.17 | 91.1 |
| C (0.1 vol. percent) | (3) | 15 | 0.24 | 87.0 |
| D (0.1 vol. percent) | (3) | 15 | 0.06 | 96.8 |
| Control | (3) | 15 | 1.88 | 0 |

(1) Stainless steel; (2) 1010 steel; (3) 1020 steel.

The above results demonstrate the corrosion inhibition of the polyvinylpyridine (Inhibitor A), its methyl iodide and tetrachloroethane quaternary salts (Inhibitors B and C), and the mixture of the polyvinylpyridine and the propargyl alcohol (Inhibitor D). The results also demonstrate the useful combination of the alcohol and the polyvinylpyridine over the results of the polyvinylpyridine alone and the quaternary salt alone.

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

We claim:
1. An aqueous solution containing a non-oxidizing acid and a corrosion inhibitor which comprises a vinylpyridine polymer, its salt, or mixture thereof.
2. The solution of claim 1 wherein the corrosion inhibitor is the vinylpyridine polymer.
3. The solution of claim 1 wherein the corrosion inhibitor is a quaternary salt of the polymer.
4. The solution of claim 1 wherein the corrosion inhibitor is a mixture of the polymer and its salt.
5. The aqueous solution of claim 3 wherein the quaternary salt is an alkyl halide.
6. The solution of claim 3 wherein the quaternary salt is a betaine.
7. The solution of claim 5 wherein the salt is methyl iodide.
8. The solution of claim 5 wherein the salt is tetrachloroethane.
9. The solution of claim 2 wherein the polymer is polyvinylpyridine.
10. The aqueous solution of claim 1 wherein the corrosion inhibitor includes an acetylenic alcohol, the alcohol being present in a minor but effective amount.
11. The solution of claim 10 wherein said mixture contains as the polymeric corrosion inhibitor between about 50–85 weight percent of the quaternary salt and between about 50–15 weight percent of the alcohol.
12. The aqueous solution of claim 11 wherein the corrosion inhibitor also includes a small but effective amount of a non-foaming surfactant.

References Cited

UNITED STATES PATENTS 3,404,094  10/1968  Keeney _____ 252—148

JOHN T. GOOLKASIAN, Primary Examiner

M. E. McCAMISH, Assistant Examiner

U.S. Cl. X.R.

106—14; 252—148, 181; 260—29.6